（12）United States Patent
Ingvast et al.

(10) Patent No.: US 8,177,895 B2
(45) Date of Patent: May 15, 2012

(54) APPARATUS FOR DEGASSING OIL

(75) Inventors: Håkan Ingvast, Själevad (SE); Andreas Norberg, Överhörnäs (SE)

(73) Assignee: Hydac Fluidteknik AB, Spanga (SE)

( * ) Notice: Subject to any disclaimer, the term of this patent is extended or adjusted under 35 U.S.C. 154(b) by 268 days.

(21) Appl. No.: 12/312,788

(22) PCT Filed: Nov. 28, 2007

(86) PCT No.: PCT/SE2007/050909
§ 371 (c)(1),
(2), (4) Date: Nov. 30, 2009

(87) PCT Pub. No.: WO2008/066484
PCT Pub. Date: Jun. 5, 2008

(65) Prior Publication Data
US 2010/0101423 A1  Apr. 29, 2010

(30) Foreign Application Priority Data

Nov. 29, 2006 (SE) ...................... 0602537

(51) Int. Cl.
*B01D 19/00* (2006.01)
(52) U.S. Cl. .......................... 96/158; 96/159
(58) Field of Classification Search ............... 96/159, 96/158, 163, 165
See application file for complete search history.

(56) References Cited

U.S. PATENT DOCUMENTS
4,880,449 A  11/1989 Babyak

FOREIGN PATENT DOCUMENTS
DE  295 14 333 U1  12/1995
WO  WO 94/28316  * 12/1994
WO  WO 94/28316 A1  12/1994

* cited by examiner

*Primary Examiner* — Duane Smith
*Assistant Examiner* — Douglas Theisen
(74) *Attorney, Agent, or Firm* — Roylance, Abrams, Berdo & Goodman, L.L.P.

(57) ABSTRACT

An apparatus for degassing oil comprising:—a room (30) for receiving oil comprising a first chamber (30a) and a second chamber (30b) connected to the first chamber;—an inlet (31) feeding oil into the first chamber;—an outlet (32) for feeding oil out of the first chamber;—a suction arrangement (40) connected to the outlet (32) for sucking out oil from the room;—a non-return valve (33) connected to the second chamber; and—a regulating device comprising a float (51) and a valve member (52) activated by the float for regulating the feeding of oil into the room. The float has a lower section (51) located in the first chamber and an upper section (51 *b*) extending into the second chamber. The upper section delimits a flow passage (63) extending between the first chamber and the second chamber. The valve member is arranged to open the inlet when the float assumes a lower position in the room and close the inlet when the float assumes an upper position in the room.

11 Claims, 3 Drawing Sheets

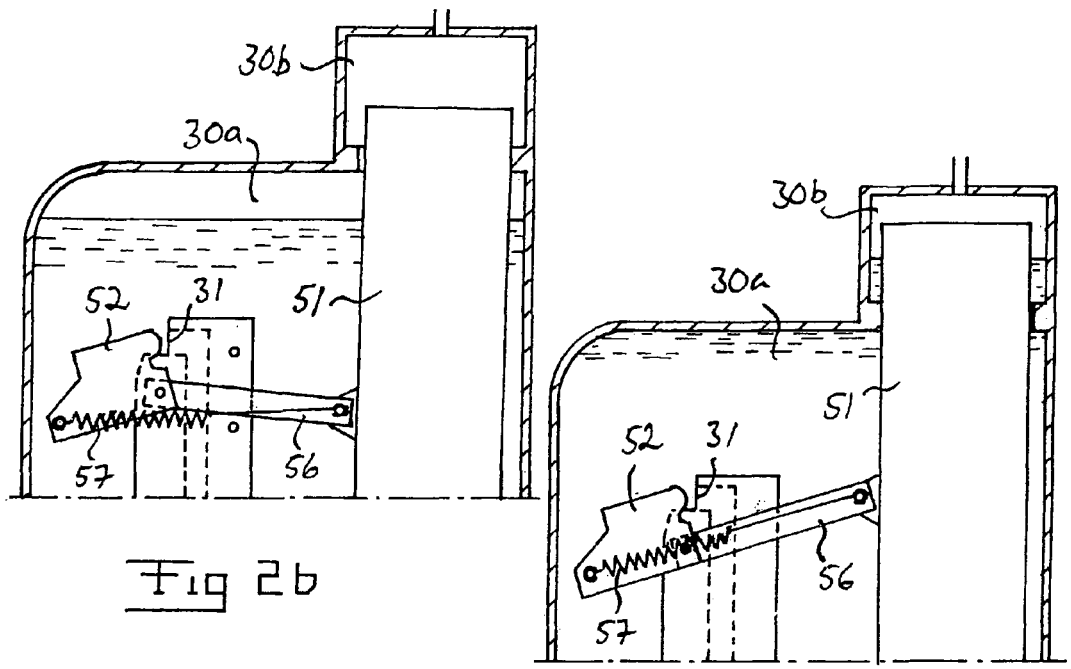
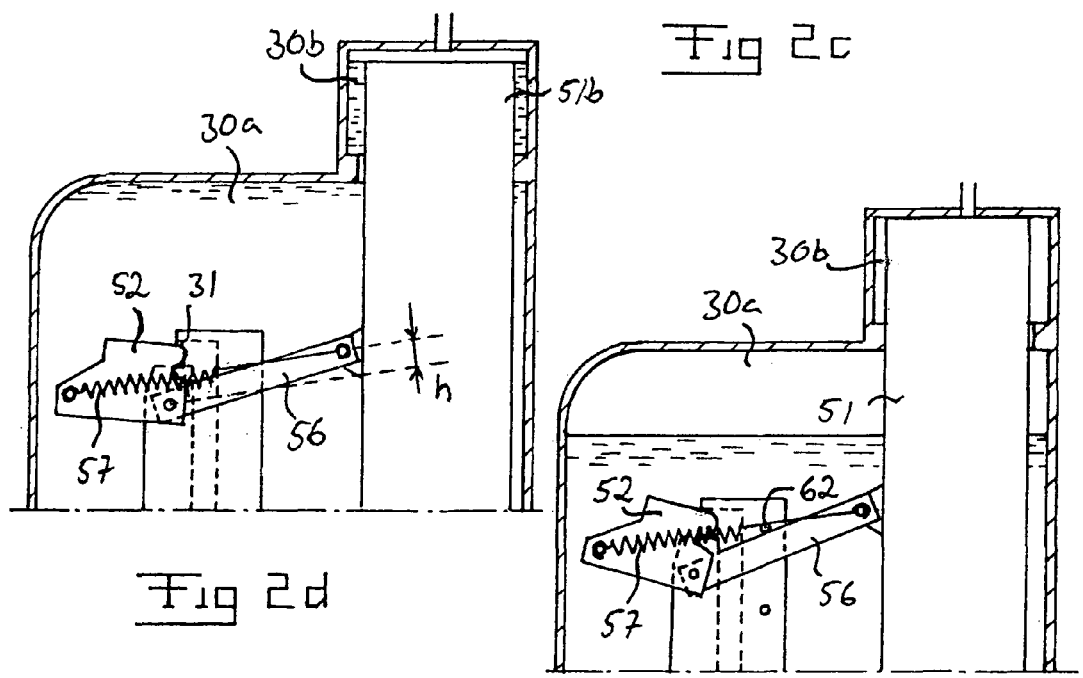

APPARATUS FOR DEGASSING OIL

FIELD OF THE INVENTION AND PRIOR ART

The present invention relates to an apparatus according to the preamble of claim 1 for degassing oil in an oil system.

The degassing apparatus of the invention is intended to be permanently mounted in an oil system, such as for instance a hydraulic oil system, a lubricating oil system or a cooling oil system, where the condition of the oil affects the function, life and operational reliability of the system.

In contact with atmospheric air at +20° C. and at 100% relative humidity, about 100 liters of air and about 0.1 liter of water will be dissolved into 1000 liters of mineral oil. This dissolvation is completely natural and cannot be prevented and will cause different kinds of problems. Air and water dissolved into the oil will cause chemical degradation of the oil and will contribute to cavitation effects and diesel effects in the system. If oil saturated with gas and water is subjected to under-pressure, dissolved gas and water is released to an extent depending on the magnitude of the under-pressure and the temperature of the oil.

An oil system normally comprises an oil reservoir for accumulation of oil. The oil returned to the oil reservoir normally has undesired free gas bubbles due to the fact that the oil has been subjected to under-pressure in the system, which has released dissolved air from the oil. These gas bubbles are very harmful if they are allowed to recirculate via the suction line of the system, and they must therefore be removed. In a traditionally constructed oil system, the removal of gas bubbles takes place by giving the oil a long retention time in the oil reservoir so that the gas bubbles will have time to rise and escape to the atmosphere via the surface in the oil reservoir. Thus, the oil reservoir has a deaerating function, which implies that the volume of the oil reservoir will be large. Despite this, the oil in the oil reservoir is almost saturated with air contributing to a degradation of the oil and to a release of air in suction lines and in pumps with loss of performance, cavitation damages and diesel effects as a result.

A degassing apparatus intended to be used for degassing oil in an oil system is previously known from WO 94/28316 A1 and is schematically illustrated in FIG. 1. This degassing apparatus 1, which is previously known as to its principle, comprises a room 2 for receiving oil to be subjected to degassing, an inlet 3 for feeding oil into the room, an outlet 4 for feeding oil out of the room and an ejector pump 5 connected to the outlet for sucking out oil from the room via the outlet. The degassing apparatus 1 further comprises a vacuum pump 6 comprising a piston device which is hydraulically operated by the oil that is to be degassed. The piston device comprises a lower piston 7, which is affected with a force upwards by the pressure in a lower chamber 8 of a lower cylinder, and an upper piston 10, which is connected to the lower piston via a tubular piston rod 9 and which is affected with a force downwards by the pressure in an upper chamber 11 of an upper cylinder. The upper cylinder comprises a further chamber 12 which sucks gas from the room 2 via a non-return valve 13 when the upper piston 10 is displaced upwards in the upper cylinder. When the upper piston 10 thereafter is displaced downwards in the upper cylinder, the gas located in the chamber 12 is then pressed out to the atmosphere via a further non-return valve 14. The displacement motions of the piston device 7, 9, 10 are controlled in dependence on the oil level in the room 2. The chamber 8 of the lower cylinder is connected to the relatively constant oil flow that is flowing into the apparatus 1 via the entrance 15 thereof. The chamber 8 is hydraulically connected to the chamber 11 via a non-viscous throttling 16 in the piston rod 9. The chamber 8 is also connected to the ejector pump 5, which conducts the oil to the exit 17 of the apparatus. The inlet 3 to the room 2 is arranged in the piston rod 9 and is closable by means of a float 18 slideably mounted in relation to the piston rod. When the oil level in the room 2 is low, the float is located in a lower position so that the inlet 3 is uncovered and oil is allowed to flow into the room 2 via this inlet. The pressure in the upper chamber 11 will then become low and the piston device 7, 9, 10 is made to assume its upper position owing to the fact that inflowing oil creates a higher pressure in the lower chamber 8 by the pressure difference at the passage of the oil through the throttling 16. When the upper piston 7 is displaced upwards in the upper cylinder, a vacuum is created in the chamber 12, which results in that gas is sucked into the chamber 12 from the room 2 via the non-return valve 13. Hereby, an under-pressure that promotes separation of gas and water from the oil is generated in the room 2. When the oil fed into the room via the inlet 3 has risen to a certain level in the room 2, the float 18 will close the inlet 3 by a displacement upwards in relation to the piston rod 9, whereupon the feeding of oil into the room 2 is interrupted at the same time as the pressures in the chambers 8 and 11 are equalized owing to the fact that the oil flow through the throttling 16 ceases. Since the piston area 10A of the upper piston is several times larger than the piston area 7A of the lower piston, the piston device will now be displaced downwards. The closing of the inlet 3 also results in that the pressure is increased upstreams of the throttling 16, since the entire oil flow entering through the entrance 15 of the apparatus will now pass through the ejector pump 5, whereby the suction capacity of the ejector pump is increased and oil is sucked out from the room 2 via the outlet 4. When the oil thereafter has sunk to a certain level in the room 2, the float 18 will again uncover the inlet 3, whereupon the piston device 7, 9, 10 will be displaced upwards while sucking out gas and water vapour from the room. Due to the under-pressure in the room 2, the oil will get supersaturated with gas when entering the room, which results in that gas bubbles are formed in the oil, which gas bubbles will rise to the oil surface and accumulate in the space above the oil surface in the room 2. Moisture in the form of water vapour will be brought along with the gas bubbles, which results in that degassing and dewatering of the oil always will take place simultaneously. Gas and water vapour released from the oil are then emitted to the atmosphere via the non-return valve 13, the chamber 12 and the non-return valve 14. The above-described operating cycle of the degassing apparatus 1 is then repeated continuously for a continuous degassing and dewatering of the oil in an associated oil system.

A degassing apparatus principally resembling the type described above has turned out to operate in an appropriate manner and has especially been used for continuous degassing of cooling oil in oil-filled power transformers where the degassing and dewatering among other things reduces the aging of the oil and of the solid insulation of cellulose.

OBJECT OF THE INVENTION

The object of the present invention is to achieve a further development of previously know degassing apparatus of the above-described type in order to provide a degassing apparatus with a design which in at least some aspect offers an advantage compared to this previously known degassing apparatus.

SUMMARY OF THE INVENTION

According to the present invention, said object is achieved by means of a degassing apparatus having the features defined in claim 1.

The degassing apparatus of the invention comprises:
- a room for receiving oil to be subjected to degassing, this room comprising a first chamber and a second chamber connected to the first chamber, the second chamber being smaller than the first chamber;
- an inlet arranged in the first chamber for feeding oil into the room;
- an outlet arranged in the first chamber for feeding oil out of the room;
- a suction arrangement connected to said outlet for sucking out oil from the room via the outlet;
- a non-return valve which is connected to the second chamber and which is arranged to allow gases and water vapour to flow out of the room and thereby allow an under-pressure that promotes separation of gas from oil to be generated in the room; and
- a regulating device comprising a float and a valve member actuated by the float for regulating the feeding of oil into the room via said inlet.

The float has a lower section located in the first chamber and an upper section extending into the second chamber. The upper section of the float delimits a flow passage extending between the first chamber and the second chamber.

The valve member is arranged to open said inlet when the float assumes a lower first position in the room and close said inlet when the float assumes an upper second position in the room.

With the degassing apparatus of the invention, it will be possible to generate the under-pressure in the degassing room required for separation of gas from oil by means of no more than variations of the oil level in the room, the required under-pressure being generated in the room when the oil sinks from an upper level in the room to a lower level in the room. Hereby, it will consequently be possible to achieve the required under-pressure in the room without using any vacuum pump. Thus, a piston device of the above-described type can be dispensed with, which makes it possible to produce a simple and efficient degassing apparatus at a relatively low cost. So as to make it possible to achieve a sufficient under-pressure in said room for an efficient gas separation without using any vacuum pump, it is required that the remaining gas volume in the room is very small when the feeding of oil into the room is interrupted. By means of said float and a suitable dimensioning of said second chamber, it will in a simple manner be possible to minimize the gas volume remaining in the room when the feeding of oil into the room is interrupted. By means of the float and the valve member, it will furthermore be possible to control the feeding of oil into the room via said inlet in a simple manner without requiring any electronic control unit or the like.

The degassing apparatus of the invention will make it possible to considerably reduce the concentration of dissolved gases and water in the oil in an oil system, whereby it will be possible to create oil systems with considerably smaller oil reservoir volume and oil volume and also higher operational reliability and longer life of the components and oil of the oil system.

According to an embodiment of the invention, the upper section of the float delimits a flow passage extending between the first chamber and the second chamber which is so dimensioned that gases are allowed to pass essentially unobstructed from the first chamber to the second chamber via this flow passage and passage of oil from the first chamber to the second chamber via this flow passage is obstructed, the float being arranged to be displaced upwards in the second chamber and assume said second position by the pressure difference ensuing when the oil has risen to and strives to pass through the flow passage. With this embodiment, the final displacement movement upwards of the float will follow the movement of the oil level. The float will act as a piston pressing out gases and water vapour via the non-return valve. With this design, the degassing apparatus will be relatively insensitive to differences in density of the oil and varying inclinations of the apparatus and will thereby be well suited for mobile machines.

According to a further embodiment of the invention, the apparatus comprises a stop valve arranged between the second chamber and the non-return valve, which stop valve comprises a valve member arranged to allow gases to pass from the second chamber to the non-return valve via the stop valve and to prevent oil to pass from the second chamber to the non-return valve via the stop valve by the pressure difference ensuing between the downstream side and the upstream side of the valve member of the stop valve when oil from the room has risen to and strives to pass this valve member. The stop valve is arranged in series with and upstreams of the non-return valve and secures that oil from the room is never allowed to reach the non-return valve.

Other embodiments of the apparatus of the invention will appear from the dependent claims and the following description.

BRIEF DESCRIPTION OF THE DRAWINGS

The invention will in the following be more closely described by means of embodiment examples with reference to the appended drawings. It is shown in.

DETAILED DESCRIPTION OF PREFERRED EMBODIMENTS

Figures 1, 2A:
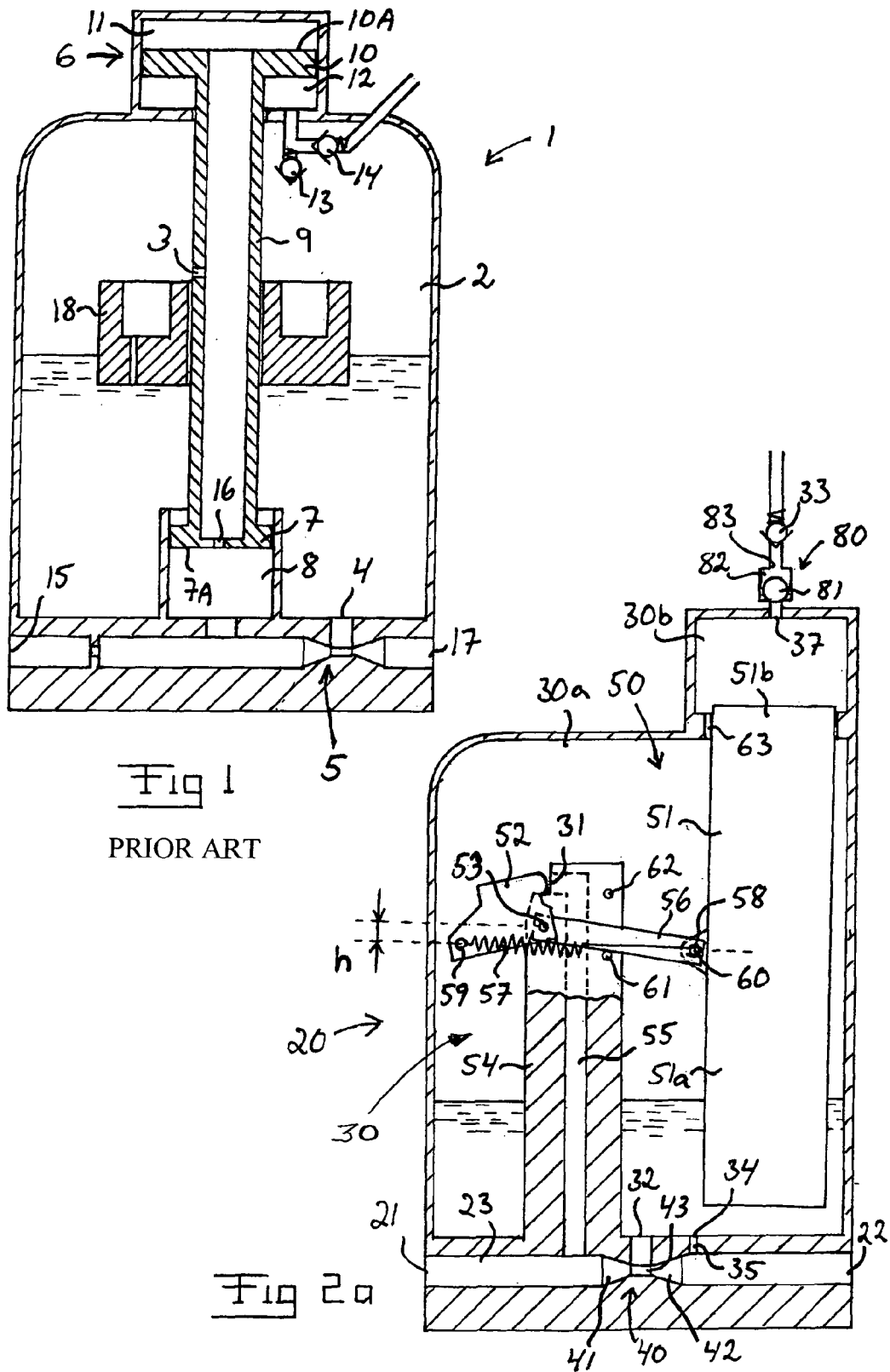
FIG. 1 a schematic, cut lateral view of a degassing apparatus according to previously known principle, FIGS. 2a-2e schematic, cut lateral views of an apparatus according to the present invention, illustrating different stages of the operating cycle of the apparatus, FIG. 3 a schematic, cut lateral view of a part of an apparatus according to an alternative embodiment of the invention, and FIG. 4 a schematic, cut lateral view of a part of an apparatus according to another alternative embodiment of the invention.

An apparatus 20 according to the present invention is illustrated in FIGS. 2a-2e. The apparatus 20 comprises an entrance 21 for feeding oil into the apparatus and an exit 22 for feeding oil out of the apparatus. The entrance 21 is connected to the exit 22 via a channel 23. The apparatus further comprises a room 30 for receiving oil to be subjected to separation, an inlet 31 for feeding oil into the room and an outlet 32 for feeding oil out of the room. The inlet 31 is directly connected to the entrance 21 of the apparatus via the channel 23. A non-return valve 33 is connected to the upper part of the room 30 and is arranged to allow gases and water vapour to flow out of the room. As to the rest, the room 30 is closed. The non-return valve 33 is connected to an outlet 37 for gases and water vapour arranged in the uppermost point of the room 30.

The apparatus further comprises a suction arrangement 40 connected to said outlet 32 for sucking out oil from the room 30 via the outlet 32. In the illustrated embodiments, this suction arrangement 40 consists of a suction pump of ejector type, which is arranged in the channel 23 between the entrance 21 and the exit 22 of the apparatus and which comprises a nozzle 41, a suction part 43 and a diffusor part 42. The outlet 32 of the room is directly connected to the suction part 43 so as to allow the suction pump to suck out oil from the room 30 via the outlet 32 and the suction part 43.

The room 30 comprises a first chamber 30a and a second chamber 30b connected to the first chamber, the second chamber being smaller than the first chamber and being arranged above the first chamber. The inlet 31 and the outlet 32 are arranged in the first chamber 30a and the non-return valve 33 is connected to the second chamber 30b.

The apparatus further comprises a regulating device 50 for regulating the feeding of oil into the room 30 via the inlet 31. The regulating device 50 is arranged to cause the feeding of oil into the first chamber 30a via the inlet 31 to be interrupted only after the first chamber 30a has been completely filled with oil and cause the feeding of oil into the first chamber 30a via the inlet 31 to start when the oil thereafter, by outfeed via the outlet 32, has sunk in the first chamber 30a to a certain lower level. Gases in the space above the oil surface are pressed out via the non-return valve 33 owing to the fact that oil is being fed into the room 30 via the inlet 31 so that the oil surface is caused to rise in the room until the remaining gas volume above the oil surface is very small. The desired under-pressure for achieving separation of gas from the oil is created in the room 30 when the oil in the room sinks to said lower level, i.e. by means of no more than the variation of the oil level in the room 30 and without assistance from any vacuum pump or the like. In order to reach a suitable under-pressure in the room 30 for gas separation when the oil sinks to the lower level, it is required that the upper turning position of the oil level in the room occurs when the remaining gas volume in the room is very small. If for instance the variation of the oil volume, i.e. the difference in oil volume between the upper and lower turning position of the oil level, is 1000 ml, the remaining gas volume in the room must be smaller than 1 ml in order to make it possible to achieve a lowest absolute pressure of 1 mbar in the room.

The regulating device 50 comprises a float 51 extending between the first chamber 30a and the second chamber 30b, which float is in contact with the oil in the room 30. The position of the float 51 is affected by the oil level in the room 30 in one of the manners described below. The float 51 has a lower section 51a located in the first chamber 30a and an upper section 51b extending into the second chamber 30b. The regulating device 50 further comprises a valve member 52 actuated by the float 51, which valve member is arranged to open the inlet 31 when the float 51 assumes a certain lower position in the room, see FIG. 2a, and close the inlet 31 when the float assumes a certain upper position in the room, see FIG. 2e. The valve member 52 is via a joint 53 pivotably mounted to a holder 54, which extends into the first chamber 30a. The inlet 31 is arranged in this holder 54 and is connected to the channel 23 via a connecting channel 55 extending inside the holder 54. The regulating device 50 further comprises a rocker arm 56 and a tension spring 57. The rocker arm 56 is at one of its ends pivotably mounted to the float 51 via a first joint 58 and at its opposite second end pivotably mounted to the holder 54 via a second joint, which may coincide with the joint 53 of the valve member, as illustrated in FIG. 2a, or may be separated from this. The tension spring 57 is mounted so as to extend between the valve member 52 and the rocker arm 56 by means of a first spring attachment 59 on the valve member arranged at a distance from the joint 53 of the valve member, and a second spring attachment 60 on the rocker arm at its end facing the float. In the illustrated example, the last-mentioned spring attachment 60 coincides with the joint 58. The spring attachments 59, 60 may for instance be formed by pins or pegs. An upper stop member 62 is arranged on the holder 54 in order to limit the rotary movement of the rocker arm in the direction upwards and a lower stop member 61 is arranged on the holder 54 under the upper stop member in order to limit the rotary movement of the rocker arm in the direction downwards. Also the movement of the valve member is limited in its open position illustrated in FIG. 2a.

The rocker arm 56, the tension spring 57 and the valve member 52 are arranged to co-operate in such a manner that the tension spring retains the valve member:

in a first rotary position, in which the valve member 52 keeps the inlet 31 open, from the moment when the float 51 assumes said lower position and until the float thereafter re-assumes said upper position, and in a second rotary position, in which the valve member 52 keeps the inlet 31 closed, from the moment when the float 51 assumes said upper position and until the float thereafter re-assumes said lower position.

The operation of the apparatus 20 illustrated in FIGS. 2a-2e will now be described. In this operational description, the terms "counter-clockwise" and "clockwise" are related to the sectional views shown in FIGS. 2a-2e. When the float 51 is in its lower position, see FIG. 2a, the valve member 52 is affected by the spring force F from the tension spring 57 and a turning moment F×h striving to rotate the valve member counter-clockwise so that the inlet 31 is kept open. The tension spring 57 exerts on the rocker arm 56 an equally large but oppositely directed turning moment F×h, which strives to rotate the valve member clockwise so that the rocker arm is pressed against the lower stop member 61. This turning moment on the rocker arm 56 caused by the tension spring 57 is added to the turning moment on the rocker arm caused by the dead weight of the float 51 and the rocker arm. Said two clockwise directed turning moments on the rocker arm 56 are in their turn counteracted by a counter-clockwise directed turning moment caused by the buoyancy force on the float 51. As the inlet 31 is kept open in this position, oil will flow into the first chamber 30a so that the oil level therein gradually rises. When the counter-clockwise rotating turning moment on the rocker arm 56 from the buoyancy force is larger than the clockwise rotating turning moment on the rocker arm from the spring force and the dead weights, the float 51 will lift from its lower position and the moment arm h will decrease, see FIG. 2b. FIG. 2c shows a position where the moment arm h is zero and where the valve member 52 has still not started to rotate clockwise for closing of the inlet 31. When the float 51 moves further upwards from the position shown in FIG. 2c, the moment arm h will increase, but now in such a manner that the valve member 52 is subjected to a clockwise directed turning moment F×h, see FIG. 2d, striving to rotate the valve member in its closing direction. FIG. 2d shows a position where the float 51 is still on its way upwards but where the clockwise directed closing turning moment has still not attained its maximum value, which will not occur until the float 51 has assumed its uppermost position according to FIG. 2e.

The valve member 52 will not start its closing movement until the turning moment from the tension spring 57 becomes larger than the oppositely directed turning moment from the impulse force of the oil flowing through the inlet 31. When the float 51 assumes its upper position, see FIG. 2e, the valve member 52 has closed the inlet 31 or is under a final movement for closing thereof. The inflow of oil to the first chamber 30a via the inlet 31 is consequently stopped and the pressure in the channel 23 increases so that the suction arrangement 40 starts to suck out oil from the first chamber 30a via the outlet 32 with a higher flow speed than before. As the oil level thereafter sinks in the room 30, the absolute pressure in the room drops so that gases and water vapour are released from the oil in the room as bubbles.

The turning moment on the rocker arm caused by the dead weight of the float 51 and the rocker arm 56 is somewhat larger than the oppositely directed turning moment on the rocker arm caused by the tension spring 57 when the rocker arm is in its upper position. The rocker arm 56 and the float 51 will therefore remain in their upper position limited by the upper stop member 62, and the valve member 52 will keep the inlet 31 closed until the oil level in the room has sunk to such a level that the influence from the buoyancy force on the turning moment of the rocker arm has become sufficiently small. When the oil thereafter has sunk in the first chamber 30a to the above-mentioned lower level by outfeed via the outlet 32, the float 51 will instantaneously fall to its lower position and the rocker arm 56 is rotated downwards from the position shown in FIG. 2e to the position shown in FIG. 2a at the same time as the valve member 52 under the action of the tension spring 57 is rotated downwards from the position shown in FIG. 2e to the position show in FIG. 2a so that the inlet 31 is re-opened for feeding of oil into the room. The operating cycle here described is repeated repeatedly for continuous degassing and dewatering of the oil.

The efficiency of the apparatus can be increased by supplying a smaller oil flow to the room 30 via a further inlet 34, which is connected to the diffusor part 42 via a non-viscous throttling 35 in a point where the static pressure is higher than in the suction part 43.

In the embodiment illustrated in FIGS. 2a-2e, the float 51 can be arranged to assume its upper position in two alternative ways.

A first alternative is characterized in that the maximum turning moment on the rocker arm 56 caused by the buoyancy force is larger than the sum of the oppositely directed turning moments on the rocker arm 56 from dead weight and spring force at the lower position of the float. In this case, the float 51 is suitably arranged to leave its lower position when the oil level in the room 30 has risen so high that oil has had time to rise up into the ring gap 63 defined by the float between the first chamber 30a and the second chamber 30b. In this case, the ring gap 63 is large and will not obstruct neither a flow of gas nor a flow of oil to pass.

The second alternative is characterized in that the maximum turning moment on the rocker arm caused by the buoyancy force is smaller than the sum of the oppositely directed turning moments on the rocker arm 56 from dead weight and spring force at the lower position of the float. In this case, the ring gap 63 is formed with a smaller play which will not obstruct a gas flow from passing but which will create a higher pressure in the first chamber 30a than in the second chamber 30b when a corresponding oil flow passes the ring gap. The upwardly directed forces on the float will hereby obtain a required contribution when an oil flow is passing the gap 63, which will make the float leave its lower position and move towards its upper turning position. So as to make it possible for the degassing cycle to start also when the second chamber 30b is completely filled with oil, an additional pressure limiting valve is required, which draws off oil from the second chamber 30b to the exit 22. This valve is not illustrated in FIGS. 2a-2e.

Figure 3:
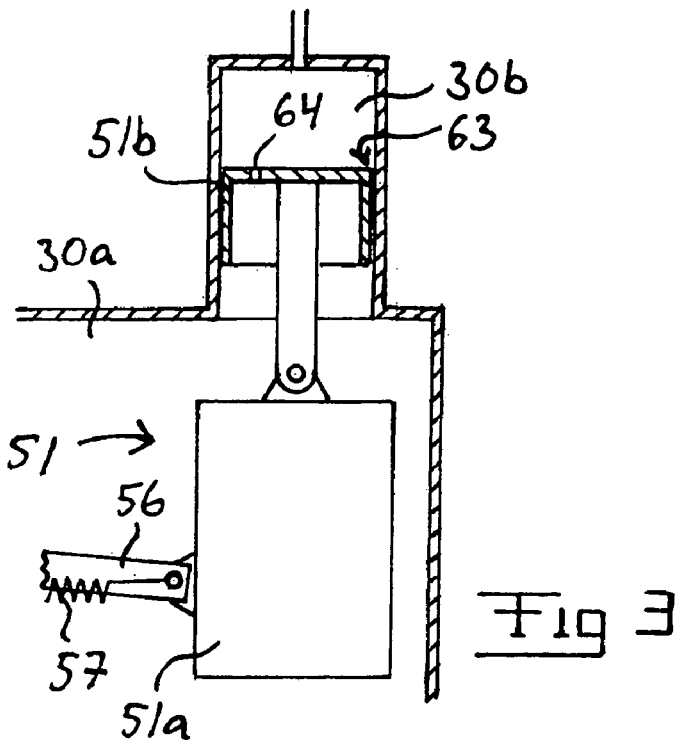
Figure 4:
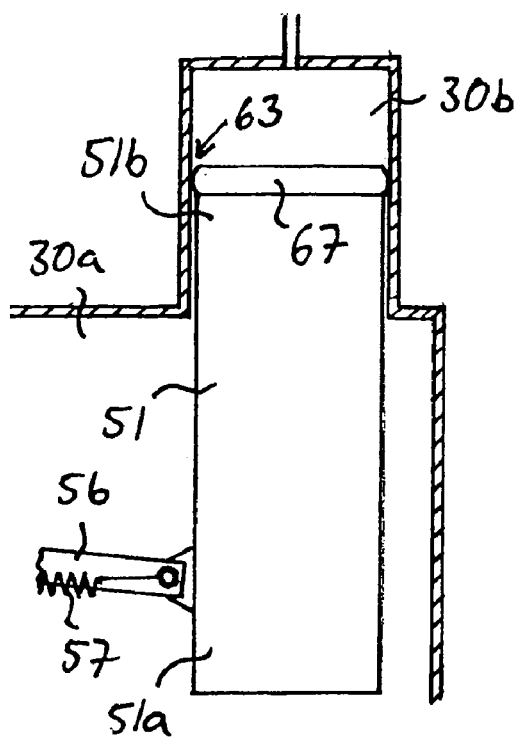

With the exception of the design and the operation of the float, the apparatuses according to FIGS. 3 and 4 are designed and arranged to operate in the same manner as the apparatus 20 that is illustrated in FIGS. 2a-2e and described above.

The implementation according to FIG. 3 is a possible implementation when applying the above-mentioned second alternative. In this case, the float is in two parts with an upper section 51b shaped as a piston which moves in a cylinder bore formed by the second chamber 30b. In the illustrated example, the upper section 51b of the float is articulately connected to the lower section 51a of the float. The ring gap 63 is here negligibly small and a gas flow can here pass via a hole 64 in the upper section 51b of the float. The hole 64 is formed as a non-viscous throttling where the pressure difference for a certain oil flow will be almost independent on the viscosity of the oil, i.e. of its temperature. This is an important characteristic when the degassing apparatus is used in mobile hydraulic systems. The upper section 51b of the float, which is shaped as a piston, may be formed with or without a buoyancy of its own.

The implementation according to FIG. 4 is also a possible implementation when applying the above-mentioned second alternative. A part 67 of the upper section 51b of the float is here shaped as a part of a sphere, this part 67 abutting against a wall of the second chamber 30b shaped as a cylinder bore. This will make it possible for the ring gap 63 between the part 67 and the cylindrical wall of the second chamber 30b to be made very small and for the centre line of the float to be allowed to assume different angular positions in relation to the centre line of the cylinder bore without affecting the size of the ring gap. It is here also possible to let the size of the ring gap vary by designing the cylinder formed by the second chamber 30b with somewhat varying inside diameter so as to hereby create different gaps depending on the position of the float.

A stop valve 80 is with advantage arranged between the outlet 37 of the room and the non-return valve 33 in series with the non-return valve, as illustrated in FIG. 2a. This stop valve comprises a valve member 81, which is arranged to allow gases to pass from the room 30 to the non-return valve 33 via the stop valve. The valve member 81 is however arranged to prevent oil from passing from the room 30 to the non-return valve 33 via the stop valve by the pressure difference ensuing between the downstream side and the upstream side of the valve member 81 of the stop valve when oil from the room 30 has risen to and strives to pass this valve member. Hereby, oil is consequently prevented from reaching the non-return valve. The valve member 81 may for instance consist of a ball of steel or other suitable material movably arranged in a cylindrical room 82, which has a somewhat larger diameter than the ball. When the ball is in its lower position, as illustrated in FIG. 2a, gases can pass the ball with a certain flow without changing the position of the ball. However, if oil with a corresponding flow strives to pass the ball, the ball will be lifted to its upper position into abutment against a valve seat 83. In this upper position, the ball will seal against the valve seat 83 and prevent the oil from passing.

The invention is of course not in any way limited to the embodiments described above. On the contrary, several possibilities to modifications thereof should be apparent to a person skilled in the art without thereby deviating from the basic idea of the invention as defined in the appended claims.

The invention claimed is:

1. An apparatus for degassing oil in an oil system, the apparatus (20) comprising:
    a room (30) for receiving oil that is to be subjected to degassing;
    an inlet (31) for feeding oil into the room (30);
    an outlet (32) for feeding oil out of the room (30);
    a suction arrangement (40) connected to said outlet (32) for sucking out oil from the room (30) via the outlet;

a non-return valve (33), which is connected to the upper part of the room (30) and which is arranged to allow gases and water vapour to flow out of the room (30) and thereby allow an underpressure that promotes separation of gas from the oil to be generated in the room (30); and a regulating device (50) for regulating the feeding of oil into the room (30) via said inlet (31), characterized in:

that said room (30) comprises a first chamber (30a) and a second chamber (30b), which is connected to the first chamber, smaller than the first chamber and arranged above the first chamber, said inlet (31) and outlet (32) being arranged in the first chamber (30a) and the non-return valve (33) being connected to the second chamber (30b);

that the regulating device (50) comprises a float (51) and a valve member (52) actuated by the float;

that the float (51) has a lower section (51a) located in the first chamber (30a) and an upper section (51b) extending into the second chamber (30b), the upper section (51b) of the float (51) delimiting a flow passage (63; 64) extending between the first chamber (30a) and the second chamber (30b); and that the valve member (52) is arranged to open said inlet (31) when the float (51) assumes a lower first position in the room (30) and close said inlet (31) when the float assumes an upper second position in the room (30).

2. An apparatus according to claim 1, characterized in:

that the flow passage (63; 64) extending between the first chamber (30a) and the second chamber (30b) is so dimensioned that gases are allowed to pass essentially unobstructed from the first chamber (30a) to the second chamber (30b) via this flow passage and passage of oil from the first chamber (30a) to the second chamber (30b) via this flow passage is obstructed; and that the float (51) is arranged to be displaced upwards in the second chamber (30b) and assume said second position by the pressure difference ensuing when the oil has risen to and strives to pass through the flow passage (63; 64).

3. An apparatus according to claim 1, characterized in that the float (51) is arranged to assume said second position only after the first chamber (30a) has been completely filled with oil.

4. An apparatus according to claims 1, characterized in that said upper section (51b) is articulately connected to said lower section (51a).

5. An apparatus according to claims 1, characterized in:

that the valve member (52) is pivotably mounted;

that the regulating device (50) comprises a tension spring (57), via which the float (51) is arranged to affect the rotary position of the valve member (52); and that the tension spring (57) is arranged to retain the valve member (52):

in a first rotary position, in which the valve member keeps said inlet (31) open, from the moment when the float (51) assumes said first position and until the float thereafter re-assumes said second position, and in a second rotary position, in which the valve member keeps said inlet (31) closed, from the moment when the float (51) assumes said second position and until the float thereafter re-assumes said first position.

6. An apparatus according to claim 5, characterized in that the regulating device (50) further comprises:

a rocker arm (56), which at a first end is pivotably mounted to a holder (54) and at an opposite second end is pivotably mounted to the float (51), the tension spring (57) being mounted so as to extend between the valve member (52) and the rocker arm (56);

a first stop member (61) for limiting the rotary movement of the rocker arm (56) downwards; and a second stop member (62) for limiting the rotary movement of the rocker arm upwards.

7. An apparatus according to claims 1, characterized in that the float (51) is arranged to assume said second position only after the oil has risen to such a height in the room (30) that it completely or at least essentially completely surrounds the upper section (51b) of the float (51).

8. An apparatus according to claims 1, characterized in that the suction arrangement (40) consists of a suction pump of ejector type comprising a nozzle (41), a suction part (43) and a diffusor part (42), said outlet (32) being connected to the suction part (43).

9. An apparatus according to claim 8, characterized in that the apparatus (20) comprises a further inlet (34) for feeding oil into the room (30), which inlet (34) is connected to the diffusor part (42) via a non-viscous throttling (35) in a point where the static pressure is higher than in the suction part (43).

10. An apparatus according to claims 1, characterized in that the apparatus (20) comprises a stop valve (80) arranged between the second chamber (30b) and the non-return valve (33), the stop valve comprising a valve member (81) which is arranged to allow gases to pass from the second chamber (30b) to the non-return valve (33) via the stop valve and to prevent oil to pass from the second chamber (30b) to the non-return valve (33) via the stop valve by the pressure difference ensuing between the downstream side and the upstream side of the valve member (81) of the stop valve when oil from the room (30) has risen to and strives to pass this valve member.

11. An apparatus according to 1, characterized in that that a part (67) of the upper section (51b) of the float is shaped as a part of a sphere and abuts against a wall of the second chamber (30b) shaped as a cylinder bore.

* * * * *